United States Patent [19]

Nozemack et al.

[11] 4,381,255

[45] Apr. 26, 1983

[54] BINDERLESS ZEOLITE EXTRUDATES AND METHOD OF PRODUCING

[75] Inventors: Richard J. Nozemack, Reisterstown; Chang W. Chi, Columbia; John J. Schwonke, Brooklandville, all of Md.

[73] Assignee: W. R. Grace & Co., New York, N.Y.

[21] Appl. No.: 225,075

[22] Filed: Jan. 14, 1981

[51] Int. Cl.³ .................. B01J 21/16; B01J 29/06; B01J 37/00

[52] U.S. Cl. .................. 252/455 Z; 423/112; 423/118

[58] Field of Search .................. 252/455 Z; 423/118, 423/328, 112

[56] References Cited

U.S. PATENT DOCUMENTS

| | | | |
|---|---|---|---|
| 2,908,549 | 10/1959 | Estes | 252/455 Z |
| 3,119,659 | 1/1964 | Taggart et al. | 423/118 |
| 3,123,441 | 3/1964 | Haden, Jr. et al. | 423/328 |
| 3,394,989 | 7/1968 | Drost | 252/455 Z |
| 3,594,121 | 7/1971 | Weber | 423/328 |
| 3,906,076 | 9/1975 | Goytisolo et al. | 423/118 |

*Primary Examiner*—Carl F. Dees
*Attorney, Agent, or Firm*—Edward J. Cabic

[57] ABSTRACT

Binderless zeolite sieve extrudates are made by extruding a mixture containing about 40–60% zeolites with the remainder being a metakaolin clay that has mixed with it about 90–120% of the stoichiometric amount of sodium hydroxide to convert the clay to a zeolite. After extrusion the particles are allowed to dry age during which time most of the clay is converted to the zeolite. A further heat treatment in a dilute caustic aqueous solution insures complete crystallization with subsequent washing and calcination to produce an adsorbent product.

9 Claims, No Drawings

BINDERLESS ZEOLITE EXTRUDATES AND METHOD OF PRODUCING

CROSS REFERENCE TO RELATED APPLICATIONS

An improvement invention based on aging of the extrudates under dry, bulk conditions in containers is disclosed and claimed in the Hilderbrandt U.S. patent application Ser. No. 225,076 filed Jan. 14, 1981 herewith.

BACKGROUND OF THE INVENTION

1. Field of the Invention

This invention relates to a process for producing binderless zeolite sieve extrudates by extruding a mixture containing about equal amounts of a zeolite powder, preferably Type A zeolite, a metakaolin clay and a near stoichiometric caustic solution. The clay in the extrudate crystallizes to form a coherent particle that is essentially all zeolite.

2. Description of the Prior Art

Zeolite sieve formates have been made by mixing zeolite particles such as a 4A zeolite with a binder. Conventional formulations contain about 80% zeolite and 20% clay binder. This mixture is then formed into shapes such as beads or extrudates. The problem with this type of forming method is that 20% of the weight of the product is an inert binder which does not contribute to any adsorption.

U.S. Pat. No. 3,119,659 to Taggart et al discloses a process for producing molecular sieve bodies in which a reactive kaolin-type clay is reacted with an alkali metal hydroxide such as sodium hydroxide to form a preformed body which is then reacted with further sodium hydroxide to form a complete zeolite. Taggart et al also illustrate a method where relatively small amounts of a previously formed zeolite are added. However, in the preferred embodiments the Taggart et al method only adds enough caustic to provide a molar ratio of $Na_2O/SiO_2$ in the range of 0.1 to 0.3. Because they do not initially provide enough caustic in the extrudate for complete conversion of the clay, their method requires a post extrusion treatment in which the extrudates are soaked in caustic liquors in both a digestion step and a heated crystallization step.

The Taggart et al method requires significant time for the digestion step as well as for a crystallization step, both conducted in their examples in the presence of a sodium hydroxide solution having a concentration of sodium hydroxide significantly greater than the 3% sodium hydroxide solution used in the present process. Because all of the clay has not reacted before the extrudate is placed in the digestion liquor, there may be some deterioration in structural rigidity of the extrudates when they are placed in the digestion liquid. The method also requires the extrudates to be dried so the moisture content is less than about 30 weight percent before they can undergo the further sodium hydroxide treatment.

3. Objects of the Invention

It is an object of this invention to produce formed zeolite molecular sieves which contain essentially 100% zeolite with negligible inert binder which have a higher adsorption capacity, a faster adsorption rate, and improved selectivity and which are in the form of hard nodules with improved attrition resistant.

It is a further object to produce a zeolite extrudate with a lower dust content.

It is a further object of this invention to form zeolite molecular sieves from a formate containing a substantial amount of metakaolin clay without requiring the extrudates to be immersed in a concentrated caustic solution in a digestion step.

It is a further object to produce a small zeolite extrudate having a diameter of about 1/16 to ⅛ inch which contains essentially no inert material.

It is a further object of the invention to obtain calcium exchanged formed zeolites having a nominal pore size of 5 Angstrom units.

These and further objects will become apparent as the description of the invention proceeds.

SUMMARY OF THE INVENTION

Binderless zeolite extrudates have been obtained from a mixture of metakaolin clay and a zeolite such as 4A sieve powder to which has been added a relatively strong caustic solution which contains about the stoichiometric amount or slightly more of caustic required to convert the metakaolin to a 4A zeolite. In these materials there is a substantial amount of clay present which comprises 40–60% of the total mixture. These materials are dry blended together. In one embodiment, part of the water used to dilute the caustic solution is added in the form of ice to chill the reaction mixture. After adding a lubricant to aid in extrusion, the mixture is passed through a forming device such as a pellet mill or an extruder having a surrounding jacket which is chilled with cooling water.

The resulting extrudates can be aged from a relatively short period of time, for example about ½ hour, before being lowered into a drum conditioner for length reduction in those instances where a long length extrudate was initially produced. Then the extrudates are aged. In one embodiment, the aging is only required to permit strengthening of the extrudates so that they can withstand the subsequent hydrothermal treatment (wet recrystallization). In another embodiment the extrudates are aged under dry, bulk storage in a container such as a 55 gallon steel drum, a 20 gallon container or a large hopper. As the caustic reacts with the metakaolin clay, the container retains the autogenous heat which develops in the central part of the bulk to gradually increase the temperature sufficient to initiate the crystallization process at which point there will result a substantial conversion of the remaining clay to the crystalline zeolite form.

After the aging has taken place by either of the two embodiments, the extrudates are treated with a heated solution of very dilute sodium hydroxide solution, such as, for example, about a 3% sodium hydroxide, to further insure complete crystallization.

The crystallized extrudates can then be washed to remove excess unreacted sodium, and then they are dried and calcined for activation. Alternatively, the washed, crystallized extrudates can be treated before drying with a calcium containing solution to exchange the sodium for calcium to produce a zeolite with a pore diameter of nominal 5 Angstrom units or the extrudates can be treated with a potassium containing solution to produce a zeolite with a pore diameter of nominal 3 Angstrom units. After the optional calcium or potassium exchange treatment, the treated extrudates are dried and then calcined to activate the sieves.

According to the present procedure the blend ratio of clay to zeolite and the amount of caustic usage are optimized to prevent impurity formation while generating an extrudate of high strength for the subsequent wet crystallization step in a dilute caustic solution. This results in a superior sieve product.

DESCRIPTION OF THE PREFERRED EMBODIMENTS

One of the unique features of the present invention is the production of a zeolite extrudate by using, in addition to a zeolite powder, a relatively larger amount of metakolin clay that is reacted in situ with caustic to form additional zeolite so that essentially the entire extrudate is made of zeolite material. The clay content of 40–60% appears to be optimum for controlling the reaction rate and heat generation so as to enable the extrusion of even 1/16" extrudates with relative ease. When adding caustic to convert the metakolin clay to the zeolite, a preferred amount of caustic to be used is about 110% of the theoretical amount required since this is near the optimum for reaction and for preventing impurity formation. A lower amount can be used such as the stoichiometric amount or even as low as about 90% of the stoichiometric amount. However, when these smaller amounts are used, a longer time is required for the chemical reaction to occur and the quality also suffers. It is also possible to increase the caustic level slightly such as up to 120% of the theoretical amount. However, as the amount of caustic is further increased beyond this level, there is more tendency to form impurities such as zeolite Z-6 (sodalite).

When a conventional extruder having a relatively long extrusion zone is employed, it is preferred to use a chilled caustic solution when formulating the clay, zeolite and caustic mixture prior to extrusion. It is desirable to have the reaction mixture at a relatively low temperature to counteract the heat given off by the exothermic reaction when the caustic reacts with the mixed clay and the frictional heat produced during the extrusion operation. Without this initial chilling the temperature would rise too fast and the reaction will take off, preventing further extrusion.

It has also been found helpful in the embodiment utilizing an auger type extruder to have a cooling chamber around the extrusion area through which chilled water flows. This chamber further removes heat from the reaction mixture as it is being extruded through the auger type extruder. When using the more preferred embodiment of a pellet mill for the extrudate formation, the caustic solution temperature control is not as essential since the hold up time of the mixture in the machine is very short.

After the material has been extruded, the extrudates are permitted to dry age. Contrary to the strong caustic solution digestion step requirement of the examples of the Taggart et al patent, it is not necessary to place the extrudates in the stronger caustic liquid solutions used in the Taggart examples to now supply a substantial portion of the caustic reactant to convert the metakaolin in the extrudate to a zeolite, since each of the extrudates has had thoroughly mixed therein almost all of the necessary caustic in the process of the present invention.

The length of the dry aging time can vary. In one of the embodiments of the invention conducted at ambient temperature, the period can be from several hours to 2-5 days depending on the ambient temperature. In another embodiment where the extrudates are stored under dry, bulk conditions such as in drums, the period can be very short such as on the order of less than 8 hours with periods of 2-8 hours ordinarily being suitable. During this aging period the excess caustic which is reacted with the metakaolin clay causes a very substantial amount of metakaolin to crystallize. The resulting product has sufficient integrity to withstand a further wet crystallization treatment.

Contrary to the Taggart procedure where the newly formed extrudates are heated prior to wet crystallization, our process does not require an extra heating step once the extrudates have been formed. Thus we save the heating energy required in the Taggart process where Taggart must heat the extrudates before they are given any further treatment.

By utilizing the dry aging crystallization technique with the high initial excess caustic according to the present invention, a substantial amount of the metakolin clay is converted to zeolite. To insure near complete conversion, the aged zeolites can be heated in an aqueous solution. It is preferred to add a small amount of caustic to the aqueous solution to prevent the caustic already present in the extrudate from leaching out the solution. Thus, treating the aged extrudates in a relatively dilute solution of about 3% caustic heated to near the boiling temperature will insure the final crystallization of almost all of the metakaolin clay to the zeolite. This post treatment with a low caustic solution is a significant production advantage since raw material usage is reduced because less caustic is required than would be necessary if a concentrated digestion solution were required.

An advantage of the embodiment of dry aging in the container is that if the product is allowed to age for a slightly longer period of about 16–40 hours, there is substantially enough crystallization occurring so that it is not necessary to use a wet crystallization step which is typically conducted at about 200° F. Instead only a warm water wash step conducted at about 110° F. is employed so there can be a substantial savings in the process energy requirements.

A further advantage of using the high caustic concentration technique in forming the initial extrudate is that the aging times are reduced. If less caustic were used then it would take a longer time for aging to enhance crystallization. There are further problems involving product quality when a relatively small amount of caustic is added in relation to the clay present. After the initial reaction has taken place there will still be some unreacted clay present if less caustic were present. When these extrudates are subsequently added to the caustic solution some of the unreacted clay is leached out which results in weaker products.

Having described above the basic aspects of the process and resulting product of this invention, the following examples are given to illustrate specific embodiments thereof.

EXAMPLE 1

This example relates to the production of the ⅛" extrudate made with a 50—50 mixture of synthetic 4A powder and metakaolin on a dry basis.

On a basis of 100 pounds of dry blend, 50 pounds of Hi-Opaque clay, a metakaolin clay obtained from Freeport Kaolin, was measured out along with 62.5 pounds of 4A zeolite powder since the powder had a 20% moisture content. These two ingredients were charged to a sigma mixer, 1 pound of Sterotex powder was added and the resulting mixture was blended together.

In another tank a caustic solution was prepared by diluting 40 pounds of a commercially available 50% caustic solution with 25.5 pounds of water and 36.5 pounds of ice to cool the mixture.

To facilitate the mixing of the dry powder and liquid, a paste was made from about 70% of the blended powder added to all of the chilled caustic solution. The paste was mixed intensively for about 10 minutes and then the remaining 30% of the blended powder was added and admixed for an additional 15 minutes.

Minor adjustment of the moisture content can be made at this point either by adding more blended powder or water. The heel should have an Ohaus of 35-36% of 800° F. In this example the actual value obtained was 36.0%.

This material was then fed into an auger type extruder having a barrel surrounding the extruder through which chilled water was passed. This was done by forming a mixture of ice, water and rock salt and the resulting water solution at a temperature below 32° F. was continuously recirculated around the barrel with a small pump.

The extrudates were aged in a thin bed on a tray for at least 2 days to give them sufficient strength to withstand the subsequent crystallization treatment in a boiling 3% NaOH solution where they were treated for about 4 hours. They were washed and dried and finally calcined at a temperature of 1000° F. for a period of 2 hours.

A crystalline analysis made by X-ray diffraction shows nearly complete conversion to zeolite A with no other phases present. The resulting extrudates had a total volatile content when measured at 1750° F. of 2.27% and when the extrudates were placed in an atmosphere of 10% relative humidity they adsorbed 23.2% water which demonstrates a very high conversion to zeolite A.

EXAMPLE 2

In this example the ⅛" extrudates of Example 1 were made to show they can be made without adding the preferred lubricant.

Following the same procedures as in Example 1, another batch was made for extrusion, but without any of the Sterotex being added. The extrudates were treated in the same manner as in Example 1. The crystalline analysis made by X-ray diffraction shows nearly complete conversion to zeolite A with no other phases present. The resulting extrudates had a total volatile content when measured at 1750° F. of 0.6% and when the extrudates were placed in an atmosphere of 10% relative humidity they adsorbed 23% water which demonstrates a very high conversion to zeolite A.

EXAMPLE 3

This example repeats the procedure in Example 1, but without the Sterotex in the extrusion mix nor the ice water flowing in the extruder barrel.

In an attempt to evelute the importance of chilling the reaction mixture as it is extruded, a comparison run was made in which the Sterotex was not used and in which the ice water was not circulating around the extruder barrel. Although some initial product was obtained, the material passing through the extruder gradually heated up so that the extrusion became inoperable. This example shows the desirability in this equipment to have cooling present to retard any exothermic reaction prior to or during extrusion.

EXAMPLE 4

This example relates to production of a 1/16" extrudate.

The procedure used in Example 1 was followed to make a 100 pound batch. The reaction material was extruded through a 1/16" plastic die. The extruded material was then allowed to sit in a thin bed for 3 days to permit crystallization to occur. Next, to insure complete crystallization, the extrudates were treated for 4 hours in a boiling 3% sodium hydroxide solution which is at a temperature of about 200°-208° F.

The extrudates were dried and then calcined for 2 hours at a temperature of 1000° F. A crystalline analysis made by X-ray diffraction shows nearly complete conversion to zeolite A with no other phases present. The resulting extrudates has a total volatile content when measured at 1750° F. of 1.96% and when the extrudates were placed in an atmosphere of 10% relative humidity they adsorbed 23.43% water which demonstrates a very high conversion to zeolite A.

EXAMPLE 5

In this example 1/16" extrudates were given a subsequent calcium exchange to produce 5 Angstrom unit sieves.

In this example the material extruded and aged as in Example 4 was given a treatment for 4 hours in a 3% sodium hydroxide solution to complete crystallization. A relatively small batch of 400 g. of the wet beads were given 3 batch exchanges for 1 hour each in a solution of 135 g. of calcium chloride in 700 ml. of water maintained at a temperature of 140° F.

The treated extrudates were then left overnight in an oven dryer and calcined at 1000° F. for 2 hours. A crystalline analysis made by X-ray diffraction shows nearly complete conversion to zeolite A with no other phases present. The resulting extrudates had a total volatile content when measured at 1750° F. of 3.57% and when the extrudates were placed in an atmosphere of 10% relative humidity they adsorbed 19.49% water which demonstrates a very high conversion to zeolite A.

Zeolites with pores of 5 Angstrom units are able to separate normal paraffins from branched paraffins. These calcium exchanged extrudates exhibit this property since they adsorbed 12.2 g. normal butane from the gas at 1 atmosphere and 22° C. while only adsorbing 0.21 g. of isobutane under the same conditions. This shows the extrudates are highly crystalline and highly selective.

EXAMPLE 6

In this example 1/16" extrudates were made from a mixture of 60% kaolin clay and 40% 4A sieves.

The procedure of Example 1 was followed with regard to the mixing of the metakolin, 4A power and Sterotex, except that the 100 pounds on a dry basis consisted of 60 pounds of the metakaolin clay and 51.3 pounds of the 4A powder since this powder contained 20% moisture.

The amount of caustic added is 110% of the theoretical amount of caustic required to react with the clay. After extrusion, the extrudates were air aged for 5 days and the subsequent crystallization treatment time in the 3% aqueous solution was increased from 4 to 5 hours because of the increased metakaolin content. A crystalline analysis made by X-ray diffraction shows nearly complete conversion to zeolite A with no other phases present. The resulting extrudates had a total volatile content when measured at 1750° F. of 2.27% and when the extrudates were placed in an atmosphere of 10% relative humidity they adsorbed 22.93% water which demonstrates a very high conversion to zeolite A.

EXAMPLE 7

This example relates to the production of 1/16" extrudates made from a 60-40 mixture of clay and zeolite which contains caustic in an amount slightly less than stoichiometric prior to extrusion.

In this example the procedure of Example 6 was followed except that instead of using the amount of sodium hydroxide for a mixture containing 60% clay (i.e. 110% of the stoichiometric amount required to react with the clay), the amount of sodium hydroxide used was for 50% clay. This corresponds to 91.7% of theoretical caustic for 60% clay.

The caustic solution was made by diluting 40 pounds of a 50% caustic solution with 5.7 pounds of ice and 30 pounds of water. The reactant material was extruded through the 1/16" die and it was allowed to age for 5 days. A part of these extrudates, 65 pounds, were subjected to a crystallization procedure that was slightly different since it utilized 75 pounds of 10% sodium hydroxide solution which was a stronger concentration than the earlier examples. This 10% sodium hydroxide solution was used for the crystallization procedure to replace the reduced amount of sodium hydroxide initially present in the mixture fed into the extruder.

In this example there was no problem in extruding and the material came from the die at a rate that was similar to the previous runs. A crystalline analysis made by X-ray diffraction shows nearly complete conversion to zeolite A with no other phases present. The resulting extrudates had a total volatile content when measured at 1750° F. of 2.68% and when the extrudates were placed in an atmosphere of 10% relative humidity they adsorbed 23.48% water which demonstrates a very high conversion to zeolite A.

The 4A sieves produced were then calcium exchanged to 5A sieves by the technique disclosed in Example 5. The resulting 5A extrudates had a total volatile content when measured at 1750° F. of 3.51% and when the extrudates were placed in an atmosphere of 10% relative humidity they adsorbed 19.49% water.

Zeolites with pores of 5 Angstrom units are able to separate normal paraffins from branched paraffins. These calcium exchanged extrudates exhibit this property since they adsorbed 11.12 g. normal butane from the gas at 1 atmosphere and 22° C. while only adsorbing 0.12 g. of isobutane under the same conditions. This shows the extrudates are highly crystalline and highly selective.

EXAMPLE 8

This example relates to the production of ⅛" extrudates made with a 50—50 mixture on a dry basis which have been aged in a drum container.

On a basis of 150 pounds of dry blend, 75 pounds of Hi-Opaque metakaolin clay and 96 pounds of 4A zeolite powder, containing about 20% moisture, were charged to a sigma mixer and 1.5 pounds of Sterotex powder was added and the resulting mixture was blended together for 15 minutes.

A caustic solution was prepared from 60 pounds of 50% caustic and 42 pounds of ice.

To facilitate the mixing of the dry powder and liquid, a paste was made from about 70% of the blended powder added to all of the chilled caustic solution. The paste was mixed intensively for about 10 minutes and then the remaining 30% of the blended powder was added and admixed for an additional 15 minutes.

This material was then fed into an auger type extruder having a barrel surrounding the extruder through which chilled water was passed. This was done by forming a mixture of ice, water and rock salt and the resulting water solution at a temperature below 32° F. was continuously recirculated around the barrel with a small pump.

The extrudates obtained had good integrity and did not generate a significant amount of heat. They were placed in a 55 gallon drum where they immediately started to heat up. Samples were taken after various times and conditions set forth in Table 1 below. In each case they were washed to remove the caustic and the amount of crystallinity measured. They then were given a crystallization treatment in a 3% caustic solution for 4 hours at 200° F. and again the amount of crystallinity was measured. In none of the cases was there any impurity found such as Z-6 or Z-14.

TABLE 1

| Run | Time After Which The Sample Was Taken (Hours) | % Crystallinity Before Crystallization | % Crystallinity After Crystallization |
|---|---|---|---|
| 1. | 3 | 44 | 64 |
| 2. | 16 | 72 | 80 |
| 3. | 40 | 75 | 85 |
| 4. | 64 | 78 | 83 |
| 5. | 88 from top of drum | — | 92 |
| 6. | 88 from bottom of drum | — | 87 |

The results of the aging tests in Table 1 show the longer the period of aging the higher the crystallinity and that a period of 16-40 hours provides an adequate level of crystallinity. In other words, by dry aging the extrudates for this period, it is not necessary to undertake a subsequent wet crystallization step. This is advantageous since it saves time required on process equipment and it also saves heat energy because instead of required temperatures of about 200° F. for wet crystallization one only uses warm water at about 110° F. for the final washing step.

Typically for many small scale runs the crystallinity after crystallization is on the order of 95%.

EXAMPLE 9

This example relates to the production of ⅛" extrudates from a round ring pellet mill.

The same formulation of Example 8 was made and mixed for 30 minutes to an Ohaus of 34.5-35.0%. The material was then fed to a ring roller pellet mill with openings which made ⅛" extrudates. The cutter permitted easy regulation of the length with length to diameter ratios, L/D, of 2 or 3 to 1. The extrudates were screened and stored in a drum. The extrudates heated up in the drum with a temperature of 190° F. being reached in less than 3 hours. After aging for 64 hours the material crystallized in a 3% caustic solution for 4 hours at 200° F., some of the extrudates were then dried and activated. A crystalline analysis made by X-ray diffraction shows nearly complete conversion to zeolite A with no other phases present.

Some of the extrudates from the 4 hour treatment with 3% were then given a calcium exchange using the same procedure set forth in Example 5 including having the treated extrudates placed overnight in a dryer and calcining them at 1000° F. for 2 hours. A crystalline analysis made by X-ray diffraction shows nearly complete conversion to zeolite A with no other phases present. The resulting extrudates had a total volatile content when measured at 1750° F. of 2.74% and when the extrudates were placed in an atmosphere of 10% relative humidity they adsorbed 19.77% water which demonstrates a very high conversion to zeolite A.

Zeolites with pores of 5 Angstrom units produced by calcium exchange are able to separate normal paraffins from branched paraffins. These calcium exchanged extrudates exhibit this property since they adsorbed 11.59 g. normal butane from the gas at 1 atmosphere and 22° C. while only adsorbing 0.12 g. of isobutane under the same conditions. This shows the extrudates are highly crystalline and highly selective.

EXAMPLE 10

This example illustrates the production of 3/32" extrudates using a pellet mill.

The same procedure of Example 9 was followed to prepare the material for extrusion. The ring roller pellet mill was used with die openings that produced 3/32" extrudates. The material hardened in 5–10 minutes and the material was stored in a drum where it heated to 190° F. in less than 3 hours. After 3 hours a sample was crystallized using a 3% caustic solution at 200° F. for 4 hours. A crystalline analysis made by X-ray diffraction shows nearly complete conversion to zeolite A with no other phases present. This example shows that after only 3 hours of aging the extruded product is ready for wet crystallization solution.

These extrudates were then given a calcium exchange using the same procedure set forth in Example 5 including placing the treated extrudates overnight in a dryer and calcining them at 1000° F. for 2 hours. A crystalline anaylsis made by X-ray diffraction shows nearly complete conversion to zeolite A with no other phases present. The resulting extrudates had a total volatile content when measured at 1750° F. of 2.69% and when the extrudates were placed in an atmosphere of 10% relative humidity they adsorbed 18.5% water which demonstrates a very high conversion to zeolite A.

Zeolites with pores of 5 Angstrom units produced by calcium exchange are able to separate normal paraffins from branched paraffins. These calcium exchanged extrudates exhibit this property since they adsorbed 11.64 g. normal butane from the gas at 1 atmosphere and 22° C. while only adsorbing 0.16 g. of isobutane under the same conditions. This shows the extrudates are highly crystalline and highly selective.

We claim:

1. Process of producing binderless zeolite sieve extrudates containing at least Type A Zeolite from clay and a synthetic zeolite, said extrudates having a higher adsorption capacity, a faster adsorption rate, improved selectivity, and improved attrition resistance, said process comprising
   (a) forming an extrudable mixture of
      (i) a synthetic zeolite,
      (ii) metakaolin clay,
      (iii) sodium hydroxide solution said clay comprising about 40–60% by weight of the total weight of the clay and the zeolite on a dry basis and the amount of sodium hydroxide being in the range of about 90–120% of the stoichiometric amount to convert the clay to a zeolite;
   (b) extruding the mixture of step (a) to form extrudates;
   (c) aging the extrudates;
   (d) treating the extrudates with a dilute solution of sodium hydroxide at an elevated temperature to complete the crystallization of the aged extrudates;
   (e) washing the extrudates; and
   (f) recovering the washed extrudates and dry calcining them whereby they can be used as selected adsorbents.

2. The process of claim 1, where the sodium hydroxide solution in step (a) is a chilled solution.

3. The process of claim 1, wherein the amount of sodium hydroxide in step (a) is 110% of the stoichiometric amount.

4. The process of claim 1, wherein the amount of clay comprises about 50% by weight of the total weight of the clay and zeolite.

5. The process of claim 1, wherein the extrudates in step (c) are aged under dry, ambient conditions to permit them to withstand the elevated temperature treatment in step (d).

6. The process of claim 1, wherein the crystallized extrudates from step (d) are treated with a calcium ion exchange to convert the nominal 4A zeolites present to nominal 5A zeolites.

7. The process of claim 1, wherein the dilute solution in step (d) contains about 3% sodium hydroxide.

8. The binderless zeolite sieve extrudate made by the process of claim 1.

9. The binderless zeolite sieve extrudate made by the process of claim 6.

* * * * *

UNITED STATES PATENT AND TRADEMARK OFFICE
CERTIFICATE OF CORRECTION

PATENT NO. : 4,381,255

DATED : April 26, 1983

INVENTOR(S) : Richard Joseph Nozemack, Chang Whan Chi, John Joseph Schwonke

It is certified that error appears in the above-identified patent and that said Letters Patent is hereby corrected as shown below: Claim 1, should appear as shown below:

-- 1. Process of producing binderless zeolite sieve extrudates containing at least Type A Zeolite from clay and a synthetic zeolite, said extrudates having a higher adsorption capacity, a faster adsorption rate, improved selectivity, and improved attrition resistance, said process comprising (a) forming an extrudable mixture of (i) a synthetic zeolite, (ii) metakaolin clay, and (iii) sodium hydroxide solution, said clay comprising about 40-60% by weight of the total weight of the clay and the zeolite on a dry basis and the amount of sodium hydroxide being in the range of about 90-120% of the stoichiometric amount to convert the clay to a zeolite;

(b) extruding the mixture of step (a) to form extrudates;

(c) aging the extrudates;

(d) treating the extrudates with a dilute solution of sodium hydroxide at an elevated temperature to complete the crystallization of the aged extrudates;

UNITED STATES PATENT AND TRADEMARK OFFICE
CERTIFICATE OF CORRECTION

PATENT NO. : 4,381,255

DATED : April 26, 1983

INVENTOR(S) : Richard Joseph Nozemack, Chang Whan Chi, John Joseph Schwonke

It is certified that error appears in the above-identified patent and that said Letters Patent is hereby corrected as shown below:

(e) washing the extrudates; and (f) recovering the washed extrudates and dry calcining them whereby they can be used as selective adsorbents. --.

Signed and Sealed this

Fifth Day of July 1983

[SEAL]

Attest:

Attesting Officer

GERALD J. MOSSINGHOFF

Commissioner of Patents and Trademarks